June 4, 1940.                J. M. LARSON                2,203,534
                          HUMIDITY CONTROLLER
                         Filed Dec. 4, 1937            3 Sheets-Sheet 1
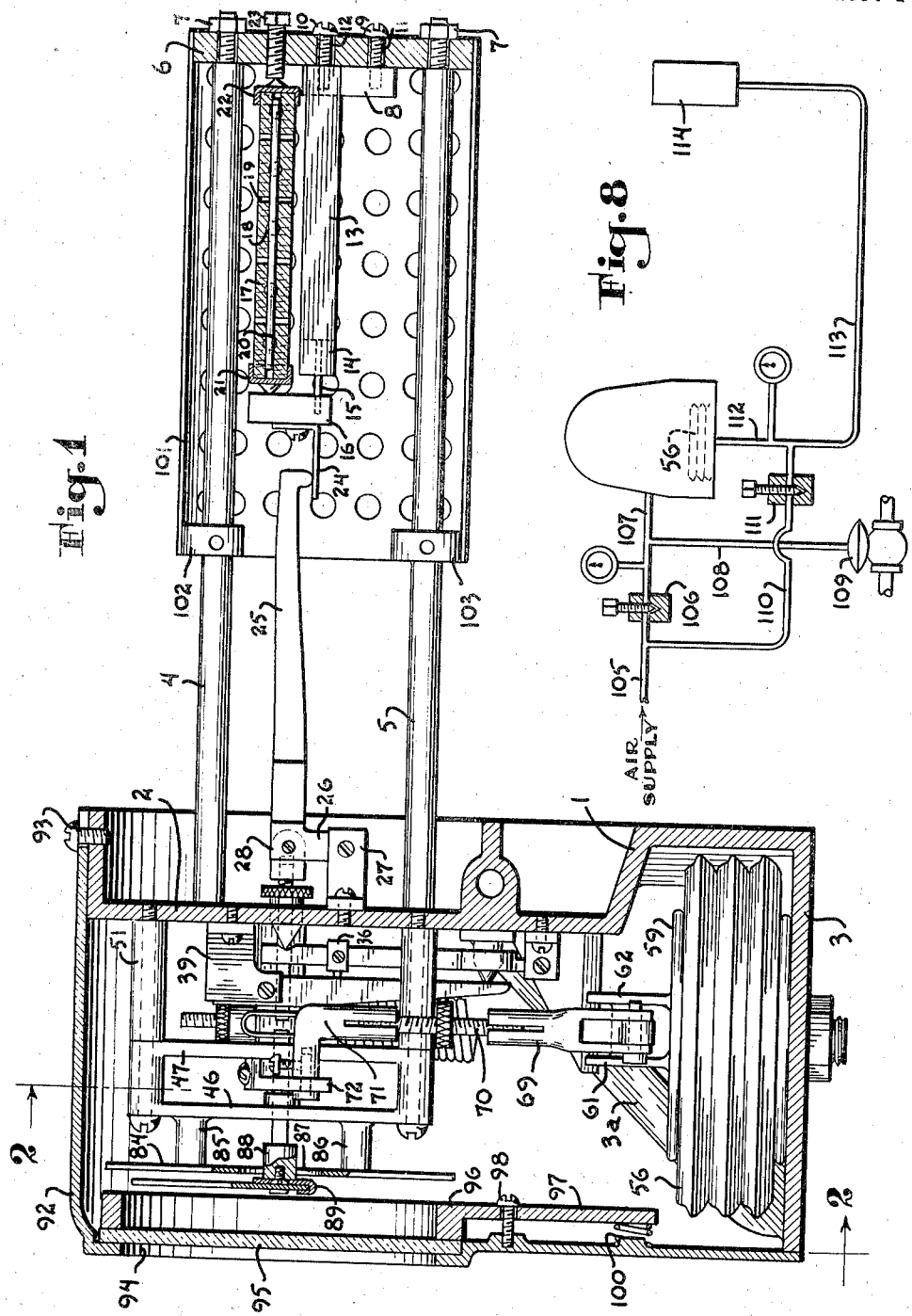
INVENTOR
John M. Larson
BY
George H. Fisher
ATTORNEY

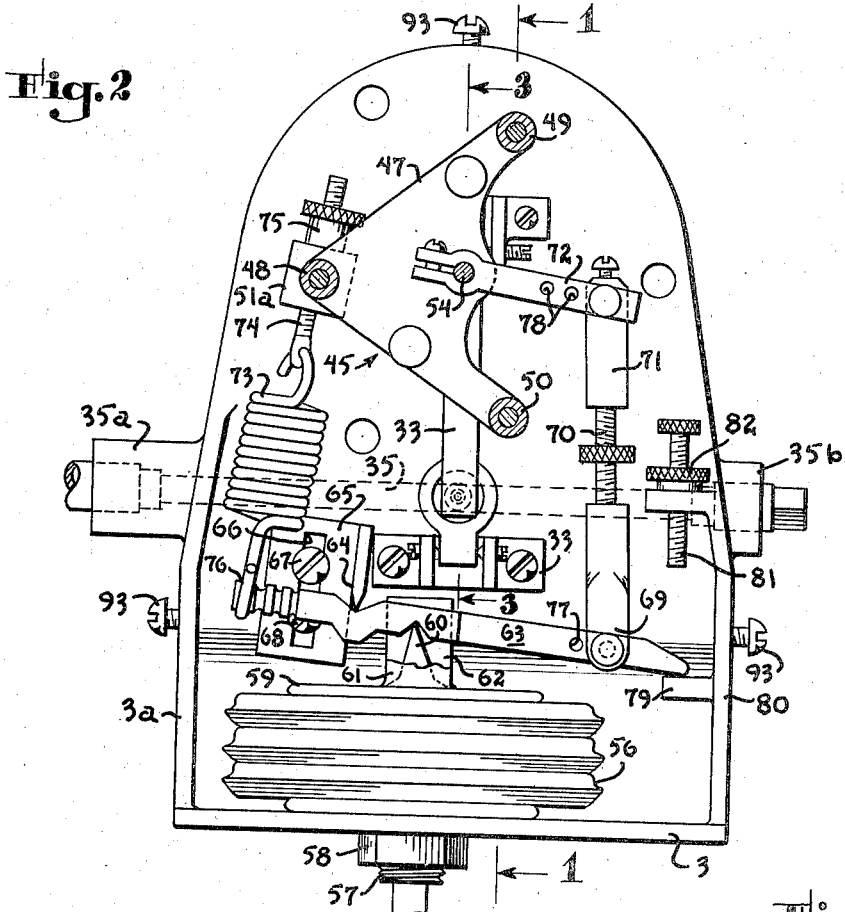

Patented June 4, 1940

2,203,534

UNITED STATES PATENT OFFICE 2,203,534

HUMIDITY CONTROLLER

John M. Larson, Chicago, Ill., assignor to Minneapolis-Honeywell Regulator Company, Minneapolis, Minn., a corporation of Delaware Application December 4, 1937, Serial No. 178,100

9 Claims. (Cl. 236—44)

This invention relates in general to condition controllers, and is more particularly concerned with controllers for maintaining a predetermined standard of relative humidity.

It is an object of my invention to provide a humidity controller which is simple and rugged in construction, and which is adapted to be adjusted from a remote point by means of a second controller, for thereby varying the value of relative humidity maintained by the controller either automatically by means of a second condition responsive controller, or manually from a control panel or other location.

Another object of my invention is the provision of a simple and accurate arrangement for varying the sensitivity of a controller for thereby permitting adjustment of the sensitivity or range of the controller to suit the particular type of control installation to which the controller is applied.

A further object of my invention is the provision of a controller of this general type in which certain parts may be interchangeably assembled for providing either a straight or reverse acting instrument with substantially the same parts, thereby reducing manufacturing expenses, and also reducing the number of different parts which must be stocked.

Further objects of my invention lie in the provision of improved forms of moisture responsive elements and control couples. Still other objects will become apparent from the following detailed description and the appended claims.

For a full disclosure of my invention, reference is made to the following description and to the accompanying drawings, in which:

Figure 1 is an elevation, partly in section, of a humidity controller embodying the features of my invention and taken on line 1—1 of Figure 2;

Figure 2 is a front sectional elevation of the controller, this figure being taken on lines 2—2 of Figure 1;

Figure 3 is a fragmentary view of the adjusting mechanism shown in Figure 1;

Figure 4 is a view of the dial and the pointer retaining device;

Figure 8 shows diagrammatically one type of system to which the controller is adapted to be applied.

Figure 5:
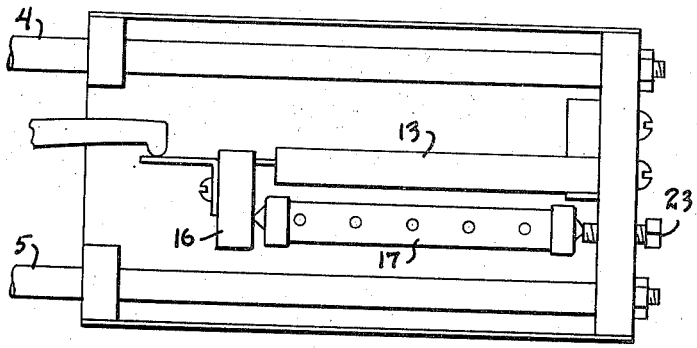
Figure 5 is a side elevation of a portion of the controller shown in Figure 1 and which shows the moisture responsive device in reverse position.

Referring to Figure 1, reference character 1 indicates a base member which is adapted for mounting upon the wall of an air conditioning chamber or duct. This base member is generally L-shaped having a vertical portion 2 and a horizontal portion 3, this horizontal portion forming a bottom plate for a housing which surrounds the control apparatus. This bottom plate if desired may be strengthened by a web 3a which extends diagonally between this plate and the vertical portion 2. Extending rearwardly from the vertical portion 2 are rods 4 and 5 upon which is mounted a cross member 6, this cross member being held against shoulders on the rods 4 and 5 by means of nuts 7 which engage reduced threaded portions of said rods. Mounted upon the cross member 6 is a block 8, this block being held against the cross member by means of screws 9 and 10 which extend through openings 11 and 12 in said cross member. The block 8, in turn, supports a horizontal extending post 13 which post may be formed of a pair of parallel strips which are fastened upon opposite sides of the block 8, as by soldering and which are spaced apart at their opposite ends by means of a smaller block 14. Into the block 14 is secured a spring member 15 which, in turn, pivotally supports an upwardly extending abutment member 16.

Extending between the abutment member 16 and the cross member 6 is a humidity responsive element 17. This humidity responsive element may comprise a bar of wood, this bar being cut across the grain of the wood to thereby expose the grain to the surrounding air. In order to further the response of this wood to changes in relative humidity, the element 17 may be drilled out for providing holes, such as 18 and 19, thereby increasing the surface of the wood which is exposed to the air. In order to prevent warping or bending of the bar 17, this bar may be drilled out longitudinally for the insertion of a stiffening member 20 which may take the form of a rod, this rod being shorter in length than the element 17 for preventing thermal expansion of the rod from affecting the operation of the instrument. The element 17 may also be provided with caps 21 and 22, the cap 21 having a conical projection which engages a depression in the abutment member 16 and the cap 22 having a similar projection which engages an adjusting screw 23 mounted in a threaded opening in cross member 6.

The abutment member 16 carries a bracket 24 which with the abutment member 16 forms a lever which is pivoted by the spring 15. The bracket 24, in turn, engages the actuating arm 25 of a bell-crank lever having another arm 26 which is pivoted to a bracket 27 mounted upon the vertical portion 2 of the base member 1. Pivotally secured to this bell-crank lever is a screw threaded member 28 (Figure 3) which is adapted to receive a threaded rod or shaft 29 having fixed thereto a knurled stop member 30. The shaft 29, in turn, carries a knife edge member 31 which abuts against the stop 30 and engages a lever arm 32 which is pivoted to a bracket 33 mounted upon the base member. The lever arm 32 is provided with an opening 32a through which the shaft 29 extends and is formed of ring-shaped configuration at its lower end, as shown in Figure 2, this allowing a bleed port member 34 which is mounted upon the base plate to extend through the lever. This bleed port member has a passage therein which communicates with a transverse air passage 35 formed in vertical portion 2. This passage communicates with bosses 35a and 35b which provide for connection of an air line to the instrument. Mounted upon the lever 32 is a sliding abutment member 36, this abutment member being adapted to engage a lever arm 37, this lever arm being substantially parallel to the lever arm 36 and being pivoted at 38 to a bracket 39 which is mounted upon the base portion 2. The lever arm 37 is provided with an opening 40 for allowing the shaft 29 to pass therethrough. This lever arm acts as a flapper valve for the bleed port member 34 and is urged against the bleed port member 34 by means of a spring 41 which is mounted within the bracket 39.

It will be understood that the humidity responsive element 17 will increase in length when the relative humidity increases, and will decrease in length when the relative humidity decreases. Assuming an increase in relative humidity, the element 17 will expand thereby causing counter-clockwise movement of the abutment member 16 upon its pivot, this causing the bracket 24 to lower the end of the lever arm 25, thus causing clockwise rotation of this lever arm about its pivot. This, in turn, will cause movement of the shaft 29 and hence the knife edge member 31 to the right which, in turn, will cause clockwise movement of the lever 32 about its pivot. This movement of the lever 32 will be transmitted by the slider or abutment member 36 to the lever arm 37 and hence will allow this lever arm to be shifted towards the bleed port member 34 by spring 41. This, in turn, will decrease the rate of bleeding of compressed air through the bleed port 34 and hence will increase the branch line pressure in a manner well understood in the art. It will be apparent that upon a decrease in humidity, the humidity responsive element 17 will decrease in length, this causing opposite movement of the various parts to the manner just described and hence the lever or valve member 37 will be shifted away from the bleed port member 34.

It will be apparent that rotation of shaft 29 will cause movement of the stop member 30 towards or away from the member 28. This, in turn, will shift the position of the knife edge member 30 relative to the lever 25 and hence will change the control point of the controller. Thus rotation of the shaft 29 provides for adjusting the controller to cause it to maintain a desired standard of relative humidity.

While the shaft 29 may be rotated manually in some cases, it is desirable to provide for automatic adjustment of the shaft, or for adjustment of the shaft from a remote point. One of the features of my invention is the provision of automatic adjusting means for varying the control point of the controller. This arrangement will now be described.

Reference character 45 indicates a frame member formed of generally triangularly shaped spaced plates 46 and 47. This frame 45 is mounted to the base portion 2 by means of screws 48, 49 and 50 (Figure 1) and is spaced from said base portion by means of spacing collars, such as 51. The screw 48 it will be noted, is received in a block 51a which is secured to the base portion 2, this block acting as a spacer. The plates 46 and 47 are provided with aligned openings 52 and 53 for receiving a shaft 54. The shaft 54 is in alignment with the shaft 29 and these two shafts are connected by means of a flexible U-shaped member 55 which acts as a universal joint. The U-shaped member 55 may be secured to the shafts 54 and 29 in any desired manner and is preferably secured to these shafts by means of slots into which reduced portions of the shafts fit. This arrangement, it will be seen, provides for rotation of the adjusting shaft 29 while at the same time permitting free movement of this shaft.

Reference character 56 indicates an expansible and contractible diaphragm which is mounted upon the base portion 3, being secured to this portion by means of a nipple 57 and a cooperating nut 58. The nipple 57 is hollow to receive an air line, and forms a passage for compressed air or other fluid into the diaphragm 56. Mounted upon the top of the diaphragm 56 is a top plate 59 upon which is formed a knife edge member 60 which is provided with guide surfaces 61 and 62 at its ends. The knife edge 60 engages a lever arm 63 which abuts a stationary knife edge member 64 which forms a part of a bracket 65 mounted upon the base portion 2. The bracket 65 is provided with a slot 66 for receiving screws 67 and 68 which secure this bracket to the base portion. It will be apparent that this arrangement provides for adjustment of the position of the knife edge member 64. The right-hand end of the lever 63 is connected to a clevis 69 and this clevis is connected through a right and left threaded adjusting connection 70 to a clevis 71 which, in turn, is connected to a lever arm 72 mounted upon the shaft 54. By this arrangement, when the diaphragm 56 expands, the lever arm 63 is rotated counter-clockwise about the knife edge member 64, this causing counter-clockwise rotation of the lever 72 and the adjusting shaft 54.

In order to bias the lever arm 63 in a direction for contracting the diaphragm 56, a spring 73 is provided, this spring having its upper end secured to a threaded stem 74 which extends through the spacer or block member 51a, this stem being attached to a knurled adjusting nut 75. The lower end of the spring 73 is attached to one of a number of notches 76 formed in the left-hand end of the lever arm 63. The spring 73, therefore, urges the lever arm 63 in a clockwise direction for biasing the bellows 56 towards contracted position. It will be apparent that by placing the end of the spring 73 in different of the notches 76, the degree of expansion or contraction of the spring for equal angular movements of the lever 63 may be varied. For instance, if the spring 73 is connected to the slot 76 at the end of the lever, the spring must be stretched a greater extent when the lever arm 63 moves from one limit to the other than would be necessary if the spring were attached to the innermost groove. Thus by changing the position of the spring 73 on the lever arm 63, the movement of the lever arm 63 for a given change in pressure within the diaphragm 56 may be varied to suit the particular conditions of the installation to which the controller is applied. It will also be noted that the lever arms 63 and 72 are provided with additional holes such as 77 and 78 for attachment of the clevises 69 and 71. By pivoting the clevises 69 and 71 to different of these holes, the angular movement of the adjusting shaft 54 for a given movement of the lever 63 may be varied to suit the particular application of the instrument. By the arrangement just described, it will be apparent that the remote adjusting device may be readily adjusted for varying the degree of adjustment provided by a given change in pressure within the bellows 56.

In order to limit the movement of the lever arm 63, this lever arm may be provided with a fixed stop member 79 which may be formed integrally with an outwardly extending portion 80, which portion acts as a brace for the horizontal portion 3 of the base member 1. The lever arm 63 may also be limited in its upward movement by means of adjustable stop member 81 which may take the form of a screw extending through another portion of the brace 80 and having a lock nut 82. By this arrangement, the total movement of the lever 63 and hence the adjustment range of the instrument may be limited as desired.

The shaft 54 not only varies the adjustment or control point of the instrument but also is arranged for operating an indicator for indicating the adjustment. Referring now to this indicating arrangement, reference character 84 indicates a circular dial which may be mounted upon studs 85 and 86 which are formed integrally with the plate 46 of the frame member 45. The dial 84 is provided with a center opening 87 and through this opening extends a collar 88 which is mounted upon the shaft 54. Attached to the collar 88 is a clip member 89 which is formed with three U-shaped clips 90 which are adapted to retain a pointer 91, the pointer being retained in place by friction. The clip member 89 is formed of smaller cross section than the opening 87 in the dial, thus permitting the dial to be inserted or removed without removal of the clip member. This provides for ready inspection and adjustment of the control mechanism behind the dial without interfering with the adjustment of the instrument. Thus, in order to inspect the working parts of the instrument behind the dial, it is necessary only to slip the pointer 91 out of the clip 87 and to remove the dial.

In order to protect the working parts of the instrument, a cover 92 is provided, this cover being formed to fit over the base member 1 and being secured thereto by means of screws such as 93. The front portion of this cover is provided with an opening 94 which coincides with the dial 84, this opening 94 being provided with a glass window 95 which may be held in place by means of an annular member 96 having a downwardly extending portion 97 which is secured to the front wall of the cover by means of a screw 98, a spring 100 being provided for urging the annular portion against the glass 95.

It is preferable to provide a guard for preventing injury to the portion of the instrument located within the duct. This guard, if desired, may consist of a pair of perforated plates, such as 101, one of which is shown removed, these plates being secured to the cross member 6 and to the rods 4 and 5 by means of collars, such as 102 and 103.

Referring to Figure 8, this figure illustrates diagrammatically a system in which the instrument of this invention may be employed. Reference character 105 indicates an air supply pipe which is connected through a restriction 106 to the pipe 107 which communicates with the bleed port member 34 of the humidity controller. The pipe 107 may also be connected by a pipe 108 to a pressure actuated valve 109 which may, for instance, control the supply of water to a humidifier. The air supply pipe 105 may also be connected by a pipe 110 to a restriction 111, the outlet of this restriction being, in turn, connected to the diaphragm 56 of the humidity controller by a pipe 112. This pipe 112 may also be connected by a pipe 113 to a thermostat 114 which in some cases may be a thermostat responsive to outdoor temperature. This thermostat 114 for this particular type of installation would be of the direct acting type. In other words, this thermostat would act to increase the rate of bleeding from the pipe 113 as the outdoor temperature decreases.

In operation, a restricted amount of air is supplied to the bleed port member 34 due to the restriction 106. If the relative humidity of the air passing over the instrument should increase, the element 17 will increase in length which will, in the manner previously described, cause the lever or valve member 37 to be shifted toward the bleed port member 34. This would decrease the rate of bleeding through the bleed port and consequently would increase the pressure of the air supplied to the valve 109, which in this case would cause closing or partial closing of this valve for restricting the supply of water to the humidifier.

If the outdoor temperature should decrease, it is desirable to decrease the standard of relative humidity maintained in order to avoid condensation of moisture on window glass. In response to such a decrease in outside temperature, the thermostat 114 will increase the rate of bleed from the pipe 113. Due to the restricted supply of air allowed by the restriction 111, this increase in bleed will cause the pressure in pipe 113 and the bellows 56 to fall. This, in turn, will cause the bellows 56 to contract under the action of the spring 73, this causing movement of the lever 63 in a clockwise direction which, in turn, rotates the shaft 54 in a clockwise direction for lowering the control point of the humidity controller and for rotating the pointer 30 to indicate this lowered control point. It will be understood that the application of my remotely adjustable or sub-master humidity controller just described is but one of many possible applications.

By adjusting the position of the slider 36 on the lever 32, the sensitivity of the instrument may be varied as desired. For instance, if the slider is in the position shown, it will be apparent that for a given angular movement of the lever 32 there will be a greater angular movement of the lever or valve member 37 than would occur if the slider 36 were shifted to a point nearer the lower end of lever 32. This arrangement provides for ready adjustment of the instrument on the job and therefore permits the instrument to be adjusted when in operation in a manner for securing the best results. This adjusting arrangement also avoids the necessity of manufacturing a series of instruments having different sensitivities.

The arrangement just described in addition to being very flexible in that the control point adjusting means and the sensitivity of the instrument may be adjusted to suit the particular requirements, also may be readily changed from a direct acting instrument to a reverse acting instrument. Referring to Figure 5, this figure shows the humidity responsive element 17 and the supporting post 13 in reversed position. Upon comparison of this figure with Figure 1, it will be noted that this result is achieved simply by removing the adjusting screw 23 from the upper opening 11 and inserting it in the lower opening 11, and removing the screw 9 from this lower opening 11 and inserting it in the upper opening. By this slight change, the humidity responsive element 17 is placed below the pivot of the abutment member 16 instead of being above this pivot as shown in Figure 1. By this arrangement, it will be apparent that the action of the controller is reversed. In other words, upon an increase in relative humidity, the rate of bleeding will now be increased instead of being decreased as would occur with the arangement shown in Figure 1. The reversing arrangement just described, it will be noted, employs exactly the same parts for a reverse acting instrument as for a direct acting instrument and consequently the expense of the manufacture of a complete line of controllers is reduced.

Figure 6:
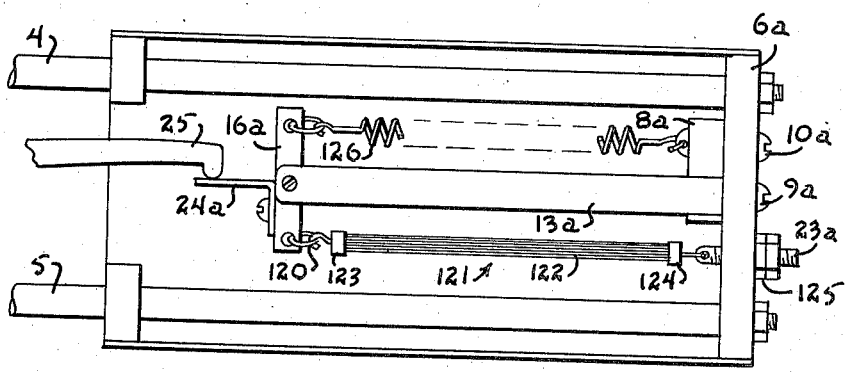
Figure 6 shows a modified form of humidity responsive element.

Referring to Figure 6, this figure shows a modified form of humidity responsive element which may be employed in place of the wooden type element shown in the preceding figures. In this figure, a block 8a is secured to the cross member 6a by means of screws 9a and 10a. Secured to the block 8a is a horizontal post member 13a, to which is pivoted a lever arm 16a. Attached to the lower end of the lever arm 16a by means, such as a ring 120, is a humidity responsive element generally indicated at 121. This element may consist of a plurality of strands 122 of hair or other moisture responsive material, the ends of these strands being secured together by means of clamping members 123 and 124. The clamping member 123 is attached to the ring 120 as shown while the clamping member 124 is attached to an adjusting screw 23a which may be locked in place by means of a lock nut 125. This arrangement provides for a factory adjustment of the instrument. Attached to the upper end of the lever arm 16a is a spring 126, the other end of this spring being attached to the block 8a as shown. This spring urges the lever arm 16a in a clockwise direction and hence maintains the strands of the humidity responsive element taut. To the lever arm 16a is attached a bracket 24a which actuates the lever arm 25 of the controller.

Upon a decrease in relative humidity, the strands 122 will decrease in length thereby causing counter-clockwise movement of the lever arm 16a against the action of spring 126, this permitting lowering of the lever arm 25. Upon an increase in relative humidity, the strands 122 will increase in length and the spring 126 will thus be permitted to rotate the lever arm 16a clockwise, thus raising the right-hand end of the lever arm 25.

Figure 7:
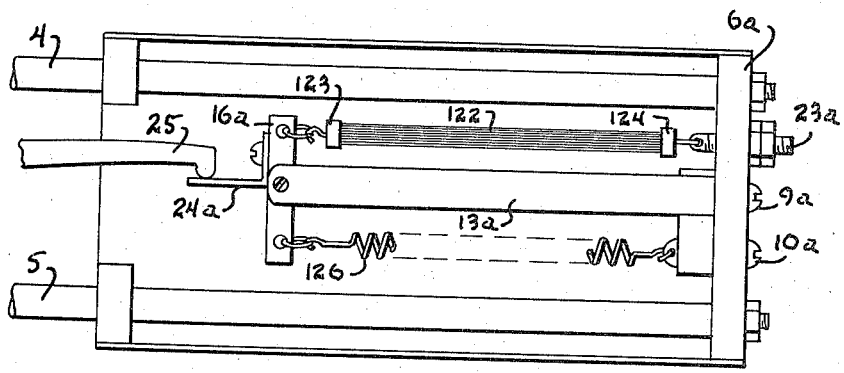
Figure 7 shows the same type of humidity responsive element as in Figure 6 but in reversed position.

Referring to Figure 7, this figure shows the humidity responsive arrangement of Figure 6 in reversed position. In this case, it will be noted that the reversal has been made in exactly the same fashion as pointed out in connection with Figure 5. Hence, with this arrangement also, exactly the same parts may be employed for assembling either a direct acting or a reverse acting instrument.

In both types of humidity responsive elements, it will be noted that the post 13 or 13a is of substantially the same length as the humidity responsive element. It will be apparent that by forming this element of a material having substantially the same thermal coefficient of expansion as the humidity responsive material, a change in temperature will have no effect upon the instrument. In some cases, however, it is desirable to compensate the instrument in accordance with the temperature of the air passing over the controller. For instance, where the controller is applied to a humidifier it is desirable to supply a greater amount of water to the sprays as the air temperature increases. This is due to the fact that the moisture content of air at constant relative humidity increases upon increase in temperature. In other words, as the air temperature increases, it is necessary to supply a greater amount of moisture to maintain a constant relative humidity than is necessary when the temperature is lower. For this reason, I contemplate forming the post 13 or 13a of a material having a higher coefficient of thermal expansion than the humidity responsive material itself. Referring to Figure 1, it will be noted that with this arrangement, assuming a constant relative humidity but a rise in dry bulb temperature, the post 13 will expand at a greater rate than the bar or element 17, and consequently the lever formed of the members 16 and 24 will be rotated slightly in a clockwise direction; this raising the end of lever arm 25 thus shifting the valve port or lever 37 away from the bleed port member 34. This will increase slightly the rate of bleed through the bleed port and will thus decrease slightly the pressure applied to the water valve 109 which will result in this valve opening further to increase the amount of water supplied to the humidifier. Thus with this arrangement, as the dry bulb temperature increases, the amount of water supplied to the sprays will be increased even though the relative humidity remains the same. Inasmuch as a greater quantity of water will be required to maintain the desired relative humidity at this higher temperature, this arrangement will tend to maintain the humidity constant. While I prefer to form the posts 13 or 13a of material having a greater coefficient of thermal expansion than the humidity responsive element, this post may, if desired, be formed of material having other coefficients of expansion.

From the foregoing description, it will be seen that I have provided a humidity controller arrangement which provides for adjustment from a remote point, for adjustment of sensitivity of the instrument to suit the needs of the particular instal'ation to which it is applied, and which may be readily assembled to form either a direct acting or reverse acting type of instrument. While I have shown and described preferred forms of my invention, it is apparent that many changes which are within the scope of my invention will occur to those skilled in the art. For this reason, I desire to be limited only by the appended claims as construed in the light of the prior art.

I claim as my invention:

1. In a humidity controller in combination, a humidity responsive device comprising an element adapted to change its dimensions upon a change in relative humidity, means for fixedly mounting one portion of said element in a manner for allowing another portion of said element to move, a support member fixedly mounted substantially adjacent the fixed portion of said element and extending substantially parallel to said element, a lever fulcrumed to said support member and engaging the movable end of said element for causing angular movement of said lever upon movement of the movable portion of said element, a control device, connecting means between said lever and said control device for actuating said control device in accordance with changes in relative humidity, motion varying means in said connecting means for varying the ratio of movement of said control device with respect to movement of said lever to vary the sensitivity of the humidity controller, said motion varying means including a first lever arm and a second lever arm, said lever arms being substantially parallel and being fulcrumed at longitudinally spaced points, and connecting means between said first lever arm and said second lever arm, said last mentioned connecting means being movable longitudinally of said lever arms, adjusting means interposed in said connecting means for adjusting the standard of relative humidity maintained, a motor device adapted to assume various positions under the command of a control instrument located remotely of the humidity controller, and connecting means between said motor device and said adjusting means for thereby adjusting the standard of relative humidity maintained by said controller from a remote point.

2. In a humidity controller in combination, a humidity responsive device comprising an element adapted to change its dimensions upon a change in relative humidity, means for fixedly mounting one portion of said element in a manner for allowing another portion of said element to move, a support member fixedly mounted substantially adjacent the fixed portion of said element and extending substantially parallel to said element, a lever fulcrumed to said support member and engaging the movable end of said element for causing angular movement of said lever upon movement of the movable portion of said element, a control device, connecting means between said lever and said control device for actuating said control device in accordance with changes in relative humidity, said mounting means for said element and said support member being reversible for permitting selective assembly of the humidity controller to provide either a direct acting or reverse acting controller with the same parts.

3. In a humidity controller in combination, a humidity responsive device comprising an element adapted to change its dimensions upon a change in relative humidity, means for fixedly mounting one portion of said element in a manner for allowing another portion of said element to move, a control device actuated by the movable portion of said element, said mounting means for the element being reversible for permitting selective assembly of the humidity controller to provide either a direct acting or reverse acting controller with the same parts.

4. In a humidity controller, in combination, a humidity responsive device comprising an element adapted to change its dimensions upon a change in relative humidity, said element comprising an elongated integral cross grained wooden member having stiffening means inserted therein to prevent warping, means for fixedly mounting one portion of said element in a manner to allow another portion of said element to move, a support member fixedly mounted adjacent the fixed portion of said element and extending substantially parallel to said element, a lever fulcrumed to said support member and engaging the movable end of said element for causing angular movement of said lever upon movement of the movable portion of said element, a control device, and connecting means between said lever and said control device for actuating said control device in accordance with changes in relative humidity.

5. In a humidity controller, in combination, a humidity responsive device comprising an element adapted to change its dimensions upon a change in relative humidity, said element comprising an elongated integral cross grained wooden member having stiffening means inserted therein to prevent warping, means for fixedly mounting one portion of said element in a manner to allow another portion of said element to move, and a control device actuated by the movable portion of said element.

6. In a humidity controller, in combination, a humidity responsive device comprising an element adapted to change its dimensions upon a change in relative humidity, said element comprising an elongated cross grained wooden member having a plurality of transverse openings therein to increase the area of said element contacted by the surrounding atmosphere, a longitudinal opening in said element, a stiffening member in said opening, said stiffening member being shorter in length than said elongated member to prevent thermal expansion of said stiffening member from interfering with the action of said elongated member, and a control device actuated by the movable end of said elongated member.

7. In a humidity controller, a base member for mounting upon the wall of an air duct, a control device mounted upon said base member, a support structure extending rearwardly of said base member and adapted to be exposed to the air flowing through the duct upon which the base member is mounted, a first lever pivoted to said base member and adapted to actuate said control device, said lever also extending rearwardly of said base member, a humidity responsive device comprising an element adapted to change its dimensions upon a change in relative humidity, means for fixedly securing one portion of said element to said support structure in a manner to permit movement of another portion of said element, a support member fixedly mounted to said support structure and extending substantially parallel to said element, a second lever pivoted to said support member and engaging the movable end of said element for causing angular movement of said second lever upon movement of the movable portion of said element, said second lever being arranged for actuating said first lever to thereby cause actuation of said control device upon change in relative humidity.

8. In a humidity controller, a base member for mounting upon the wall of an air duct, a control device mounted upon said base member, a support structure extending rearwardly of said base member and adapted to be exposed to the air flowing through the duct upon which the base member is mounted, a first lever pivoted to said base member and adapted to actuate said control device, said lever also extending rearwardly of said base member, a humidity responsive device comprising an element adapted to change its dimensions upon a change in relative humidity, said element comprising an elongated cross-grained wooden member having stiffening means inserted therein to prevent warping, means for fixedly securing one portion of said element to said support structure in a manner to permit movement of another portion of said element, a support member fixedly mounted to said support structure and extending substantially parallel to said element, a second lever pivoted to said support member and engaging the movable end of said element for causing angular movement of said second lever upon movement of the movable portion of said element, said second lever being arranged for actuating said first lever to thereby cause actuation of said control device upon change in relative humidity.

9. In a humidity controller, a base member for mounting upon the wall of an air duct, a control device mounted upon said base member, a support structure extending rearwardly of said base member and adapted to be exposed to the air flowing through the duct upon which the base member is mounted, a first lever pivoted to said base member and adapted to actuate said control device, said lever also extending rearwardly of said base member, a humidity responsive device comprising an element adapted to change its dimensions upon a change in relative humidity, said element comprising a strand of moisture responsive material, a support member, a second lever arm pivoted to said support member, means for connecting one end of said element and said support member to said support structure and for connecting the other end of said element to said second lever arm, and means for biasing said second lever arm in a manner to maintain the strand of said element taut, said second lever actuating said first lever to thereby actuate said control device upon change in relative humidity.

JOHN M. LARSON.